(12) United States Patent
Setlak et al.

(10) Patent No.: US 7,734,074 B2
(45) Date of Patent: Jun. 8, 2010

(54) FINGER SENSOR APPARATUS USING IMAGE RESAMPLING AND ASSOCIATED METHODS

(75) Inventors: Dale R. Setlak, Melbourne, FL (US); Barbara E. Cornett, Melbourne Beach, FL (US); Kuntal Sengupta, West Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 925 days.

(21) Appl. No.: 11/356,895

(22) Filed: Feb. 17, 2006

(65) Prior Publication Data

US 2006/0182319 A1  Aug. 17, 2006

Related U.S. Application Data

(60) Provisional application No. 60/654,633, filed on Feb. 17, 2005.

(51) Int. Cl.
*G06K 9/00* (2006.01)
(52) U.S. Cl. .............. 382/124; 382/125; 382/126; 382/127; 340/5.53; 340/5.83; 356/71; 713/186; 283/68; 283/69
(58) Field of Classification Search ......... 382/124–127; 340/5.53, 5.83; 356/71; 713/186; 283/68, 283/69
See application file for complete search history.

(56) References Cited

U.S. PATENT DOCUMENTS

| 5,963,679 | A | 10/1999 | Setlak | 382/312 |
|---|---|---|---|---|
| 6,002,815 | A | 12/1999 | Immega et al. | 382/312 |
| 6,259,804 | B1 | 7/2001 | Setlak et al. | 382/124 |
| 6,289,114 | B1 | 9/2001 | Mainguet | 382/124 |
| 7,043,061 | B2 * | 5/2006 | Hamid et al. | 382/124 |
| 7,203,347 | B2 * | 4/2007 | Hamid | 382/124 |
| 2002/0012455 | A1 * | 1/2002 | Benckert | 382/124 |
| 2002/0049908 | A1 * | 4/2002 | Shimosato et al. | 713/186 |
| 2003/0035570 | A1 * | 2/2003 | Benkley, III | 382/124 |
| 2003/0210809 | A1 * | 11/2003 | Kim | 382/124 |
| 2004/0025187 | A1 | 2/2004 | Cannon et al. | 725/105 |
| 2005/0089202 | A1 | 4/2005 | Setlak et al. | 382/124 |

FOREIGN PATENT DOCUMENTS

| EP | 1179801 | 3/2001 |
|---|---|---|
| EP | 1420360 | 11/2003 |
| JP | 2004086463 | 3/2004 |
| JP | 2004164170 | 6/2004 |
| WO | WO03052675 | 6/2003 |
| WO | WO2004026139 | 4/2004 |

* cited by examiner

*Primary Examiner*—Vikkram Bali
*Assistant Examiner*—Daniel Zeilberger
(74) *Attorney, Agent, or Firm*—Allen, Dyer, Doppelt, Milbrath & Gilchrist, P.A.

(57) ABSTRACT

A finger sensor may include a plurality of finger image sensing arrays for generating a respective plurality of finger image data sets based upon sliding finger movement over the finger image sensing arrays, and a processor cooperating with the finger image sensing arrays. The processor may determine finger movement based upon the finger image data sets, and generate a resampled finger image data set by resampling the finger image data sets based upon the determined finger movement. The processor may further deskew the finger image data sets when generating the resampled finger image data set.

26 Claims, 6 Drawing Sheets

FINGER SENSOR APPARATUS USING IMAGE RESAMPLING AND ASSOCIATED METHODS

RELATED APPLICATION

This application is based upon prior filed provisional application Ser. No. 60/654,633 filed Feb. 17, 2005, the entire subject matter of which is incorporated herein by reference in its entirety.

FIELD OF THE INVENTION

The invention relates to biometrics, and, more particularly, to finger sensing and associated methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. Nos. 5,963,679 and 6,259,804 and assigned to the assignee of the present invention, the entire contents of which are incorporated herein by reference. The fingerprint sensor is an integrated circuit sensor that drives the user's finger with an electric field signal and senses the electric field with an array of electric field sensing pixels on the integrated circuit substrate. Additional finger sensing integrated circuits and methods are disclosed in U.S. Published U.S. patent application Ser. No. 2005/0089202 entitled "Multi-biometric finger sensor including electric field sensing pixels and associated methods", also assigned to the assignee of the present invention, and the entire contents of which are incorporated herein by reference.

One type of integrated finger sensor is a so-called slide or swipe sensor that includes a relatively small rectangular sensing surface over which the user slides or swipes his finger. It may be desired to generate a global image of the user's finger from data collected from the slide sensor. Indeed, the prior art may be considered as include two classes of system design philosophies for constructing the global image from a slide sensor. One class uses various types of finger speed sensors to either control the sampling rate or discard repeated data, such as disclosed, for example, in U.S. Pat. No. 6,002,815. Another class uses cross correlation between partially overlapped image frames to eliminate redundant data and stitch together into a single global image, such as disclosed in U.S. Pat. No. 6,289,114.

These prior approaches suffers from certain disadvantages. For example, two separate processes may be required for image deskewing and partial image stitching. They may lack a mechanism to reduce noise caused by non-uniform finger movement effects, may have no mechanism to reduce sensor fixed pattern noise, and may not easily adapt to widely varying finger speeds. Of course, when the finger slides at slower speeds, extra data is typically discarded.

SUMMARY OF THE INVENTION

In view of the foregoing background it is therefore an object of the invention to provide a finger sensor apparatus and related methods producing a high quality image data set for a finger slide application.

This and other objects, features and advantages in accordance with the invention are provided by a finger sensor apparatus comprising a plurality of finger image sensing arrays for generating a respective plurality of finger image data sets based upon sliding finger movement over the finger image sensing arrays; and a processor cooperating with the finger image sensing arrays for determining finger movement based upon the finger image data sets, and for generating a resampled finger image data set by resampling the finger image data sets based upon the determined finger movement. The processor may further deskew the plurality of finger image data sets when generating the resampled finger image data set. In other words, the processor may account for the incremental finger movement accumulated during the time the sensor sequentially reads pixels starting at one side of the sensor and progressing across to the other side. The processor may also account for movement of the finger at an angle from perpendicular to the finger image sensing arrays, and may account for change in this angle over the course of the swiping operation.

The processor may scan the plurality of finger image sensing arrays at a rate sufficient so that the resampled finger image data set defines a supersampled finger image data set of the finger image data sets. Accordingly, the processor may also generate the resampled finger image data set by downsampling the supersampled finger image data set to a desired resolution. The processor may also scan each of the finger image sensing arrays so that each finger image data set defines a complete finger image data set.

The processor may determine finger movement based upon identifying and tracking at least one finger feature in each of the plurality of finger image data sets. For example, the processor may determine finger movement in two dimensions.

The processor may further determine a finger match based upon the resampled finger image data set and a stored finger image data set. In the alternative or in addition thereto, the processor may generate a finger image on a display based upon the resampled finger image data set.

Each of the finger image sensing arrays may comprise a linear array of finger image sensing pixels. For example, each of the finger image sensing pixels may comprise an integrated circuit finger image sensing pixel.

In some embodiments the processor may be incorporated on the same integrated circuit as the sensing pixels, while in other embodiments the processor may be a host processor of an electronic device including the finger sensing arrays. In these separated processor embodiments, a multiplexed data bus may be connected between the finger image sensing arrays and the processor. In addition, at least some adjacent ones of the finger image sensing arrays may be arranged with a nonuniform spacing. As mentioned briefly above, the finger sensing apparatus may be advantageously incorporated with a portable electronic device comprising a housing.

Another aspect of the invention is directed to a finger sensing method. The method may include generating a respective plurality of finger image data sets based upon sliding finger movement over a plurality of finger image sensing arrays; determining finger movement based upon the finger image data sets; and generating a resampled finger image data set by resampling the finger image data sets based upon the determined finger movement. In addition, generating the resampled finger image data may further comprise deskewing the plurality of finger image data sets.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
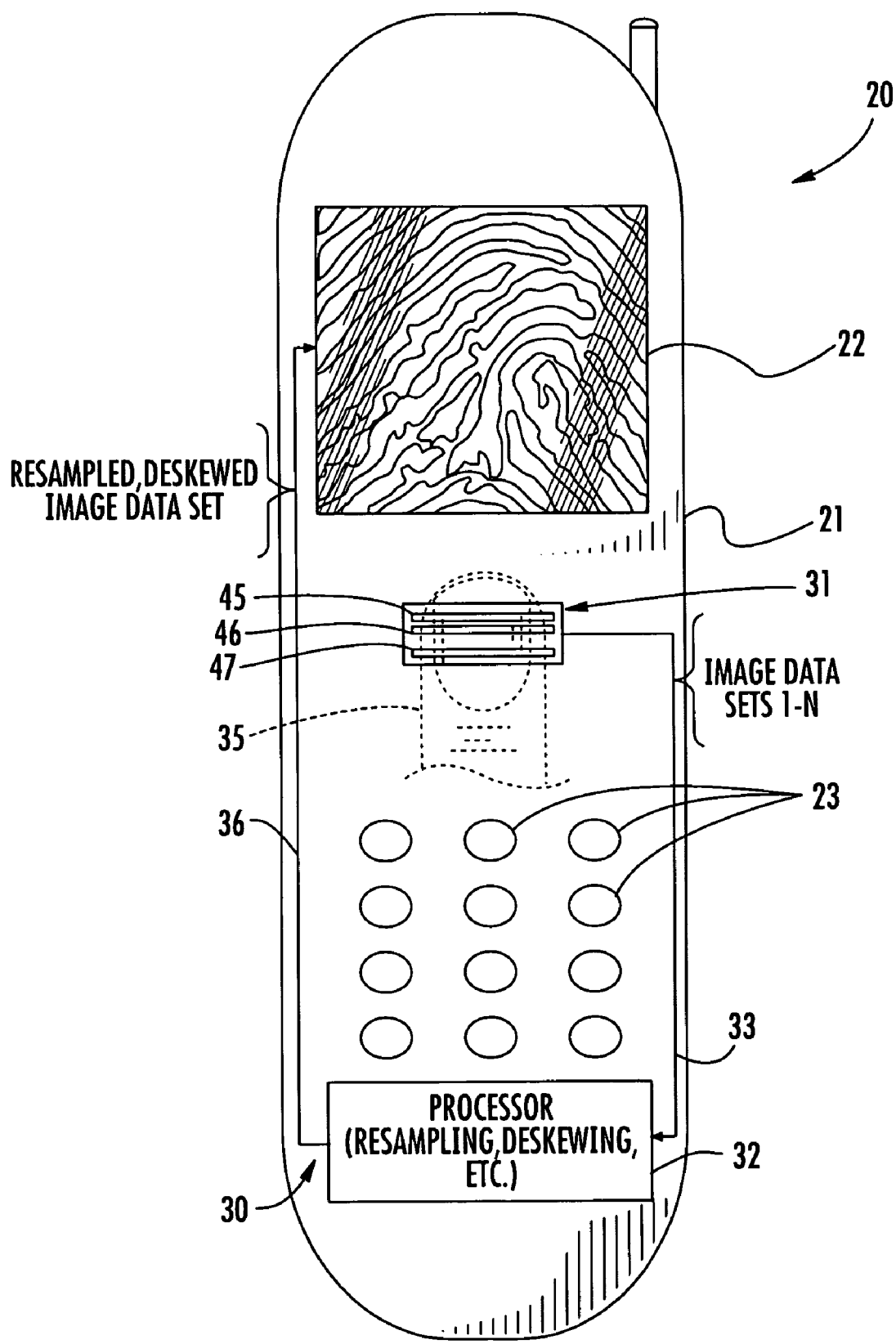
FIG. 1 is a schematic diagram of an electronic device including the finger sensing apparatus in accordance with the invention.
Figure 2:
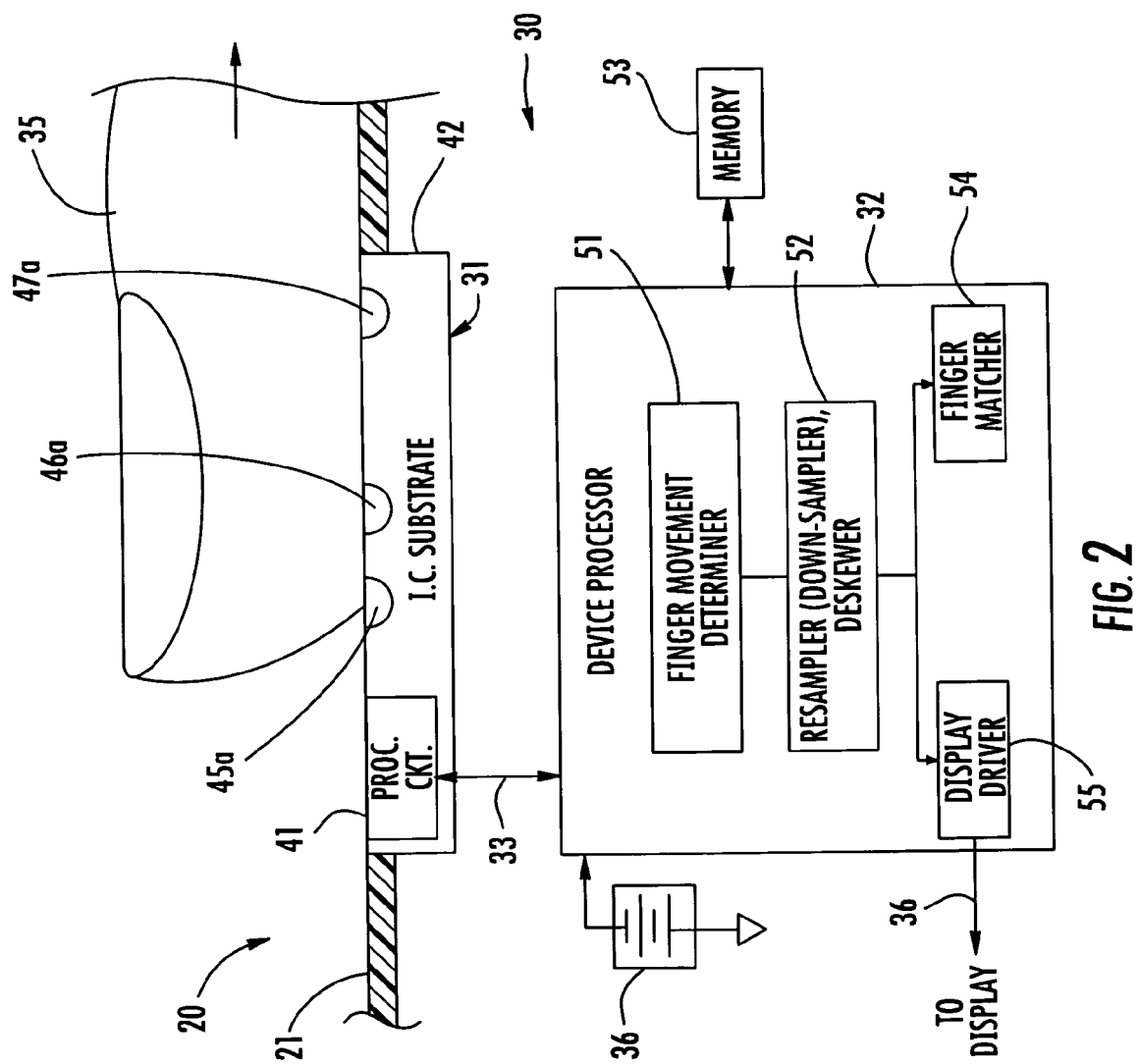
FIG. 2 is a more detailed schematic diagram, partially in section, of the finger sensing apparatus as shown in FIG. 1.

Referring now initially to FIGS. 1 and 2 an exemplary electronic device in the form of a cellular telephone 20 including the finger sensing apparatus 30 in accordance with the invention is now described. The cellular telephone 20 includes a portable housing 21 that, in turn, carries the finger sensing apparatus 30. Additionally, the cellular telephone 20 illustratively includes a display 22 and input keys 23 also carried by the housing 21. A rechargeable battery 36 may power the various electronic components as will be appreciated by those skilled in the art. The display 22 is connected to the host or device processor 32 via the line 36. The device processor 32 is also illustratively connected to the slide finger sensor 31 via a multiplexed communications bus 33 as will be described in greater detail below. Other electronic devices, such as PDA's laptops, etc. may also use the finger sensing apparatus 30.

The finger sensing apparatus 30 includes the slide finger sensor 31 illustratively in the form of an integrated circuit including an integrated circuit substrate 42 and having three linear finger sensing arrays 45-47 therein. In addition, the slide finger sensor 31 also illustratively includes optional processing circuitry 41 therein that may perform some or all of the image processing described herein. In some embodiments, most or all of the image processing may be performed by the device processor 32. The device processor 32 may include its own embedded memory or may be connected to an external memory 53 as shown in the illustrated embodiment.

As will be appreciated by those of skill in the art, the device processor 32, such as for a cellular phone or other portable electronic device, typically has additional processing resources that can be readily used by the finger sensing apparatus 30. Of course in other embodiments, all of the image processing may be performed by the onboard processing circuitry 41 of the integrated slide finger sensor 31. As will also be appreciated by those skilled in the art, other types of finger sensors relying upon relative motion between the user's finger 35 and the sensing arrays may also benefit by the processing techniques described herein.

In the illustrated slide finger sensor 31 three linear finger sensing arrays 45-47 are provided, and the arrays have a non-uniform spacing. In other embodiments, the arrays 45-47 may be uniformly spaced, and the number of arrays can also be different. In addition, each of the finger sensing arrays 45-47 may be linear as illustrated, and may comprise a plurality of integrated circuit finger image sensing pixels 45a-47a as shown perhaps best in FIG. 2. For example, the integrated finger image sensing pixels 45a-47a may be electric field sensing pixels as disclosed in U.S. Pat. Nos. 5,963,679 and 6,259,804, the entire contents of which are incorporated herein by reference. In other embodiments, different types of integrated finger sensing pixels may be used, such as based upon thermal, infrared, or optical sensing, for example. In still other embodiments, finger sensing arrays may be provided in a form other than integrated circuit form as will also be appreciated by those skilled in the art.

The finger sensor apparatus 30 includes the finger image sensing arrays 45-47 for generating a respective plurality of finger image data sets based upon sliding finger 35 movement over the finger image sensing arrays, and a processor cooperating with the finger image sensing arrays. In the illustrated embodiment, the processor is in the form of the separate host or device processor 32. The processor 32 is configured or programmable for determining finger movement based upon the finger image data sets, and for generating a resampled finger image data set by resampling the finger image data sets based upon the determined finger movement. In other words, the processor 32 may define the illustrated finger movement determiner 51 as well as the illustrated resampler 52 connected downstream therefrom. As will be explained in greater detail below, the processor's resampler 52 may also deskew the finger image data sets when generating the resampled finger image data set to account for movement of the finger 35 at an angle from perpendicular to the finger image sensing arrays 45-47.

The processor 32 may scan the finger image sensing arrays 45-47 at a rate sufficient so that the resampled finger image data set defines a supersampled finger image data set of the plurality of finger image data sets. Accordingly, the processor 32 may also generate the resampled finger image data set by downsampling the supersampled finger image data set to a desired resolution. The processor 32 may also scan each of the finger image sensing arrays 45-47 so that each finger image data set defines a complete finger image data set. This is in contrast to those prior art approaches that collect only partial images and/or delete redundant data during scanning, for example.

The processor's finger movement determiner 51 may determine finger movement based upon identifying and tracking at least one finger feature in each of the finger image data sets as will be appreciated by those skilled in the art. More particularly, the processor 32 may determine finger movement in two dimensions.

The processor 32 may further determine a finger match based upon the resampled finger image data set and a stored finger image data set. The illustrated device processor 32 schematically includes a finger matcher 54 the operation of which will be appreciated by those skilled in the art. In the alternative or in addition thereto, the processor 32 may also include the display driver 55 to generate a finger image on the display 22 based upon the resampled finger image data set.

Another aspect of the invention is directed to a finger sensing method. The method may include generating a respective plurality of finger image data sets based upon sliding finger movement over a plurality of finger image sensing arrays 45-47; determining finger movement based upon the finger image data sets; and generating a resampled finger image data set by resampling the finger image data sets based upon the determined finger movement. In addition, generating the resampled finger image data may further comprise deskewing the plurality of finger image data sets.

Considered in other terms, the method places several sensing arrays 45-47 in the path of the moving finger 35, where each array generates a complete image of the finger. The resulting data is several images of the same object (finger) taken simultaneously, but from different sensor locations separated by known physical distances. Since the finger speed can vary widely during the capture process, the raw images may have variable pixelation in the direction of finger movement. The processor 32 then uses these several images to compute a profile of the finger movement with respect to time, which can then be used to perform an optimum resampling of the raw images to produce a single high-quality normalized image with regular pixelation. The optimum resampling can simultaneously correct the data skew caused by the sensor's finite scan rate, and the pixelation variations caused by variable finger speed. This approach is in some ways similar to stereoscopic vision, where two different images are combined into a single resultant image. It also shares some characteristics with the signal processing used when a single radio signal from a moving object (like a cellphone in a car) is captured by several different antennas at different locations with different delays.

The finger sensing apparatus 30 includes a plurality of linear pixel arrays 45-47 arranged so that a finger sliding thereacross passes over the arrays sequentially. The linear arrays 45-47 may be scanned synchronously or at least with a known time relationship between the scans. Each linear array 45-47 generates an image of the complete finger surface with a variable vertical pixel pitch that depends on the sliding-speed of the finger. A finger velocity profile estimate is developed by finding the location of selected features in the images generated by each of the linear arrays, and using the known physical spacings of the arrays 45-47 to compute the velocity. Motion in one or two dimensions can be computed. The finger velocity profile may then be used to deskew the linear array images and to resample the images into a standard fixed sample rate image.

The finger sensing apparatus 30 and associated methods provide a number of advantages. For example, the finger sensing apparatus 20 enjoys accuracy across wide variations in finger speed. Accurate imaging provided even in the presence of wide variations in finger speed requires that data from sequentially scanned sensor arrays be adjusted for the delays that occur between scanning pixels at different positions in the array. The deskewing process compensates for these delays and produces the same final image independent of finger speed.

The finger sensing apparatus 30 and associated methods may also provide enhanced efficiency. The deskewing and the resampling may be combined into a single optimized process. The approach works with motion in either one or two dimensions, and therefore can efficiently accommodate motion that is not aligned normal to the linear arrays 45-47. The sensing apparatus 30 and associated methods may also reduce image noise and artifacts by scanning the skin several times, each time using a different linear sensor array, and combining these measurements into a single optimum result. Slower finger movement may be permitted to produce improved sensitivity, reduced noise and artifact reduction, by incorporating more measurements into the computation of the final result. Weak imaging fingers that cannot generate useful images in prior art devices can now be imaged successfully by using slower finger movement.

The spacing between the linear arrays 45-47 may not be critical, but can be optimized in different ways for different purposes. For example, non-uniform spacing between the linear arrays 45-47 can improve the systems ability to work with finger motions that occur at various angles to the linear array normal direction.

Figure 3:
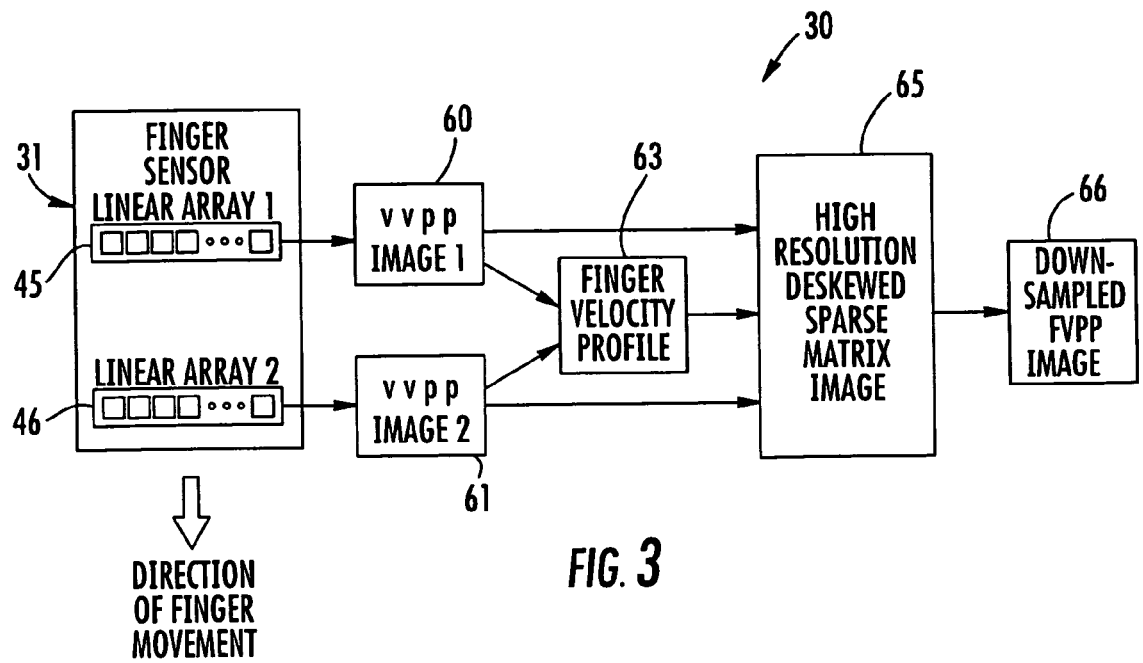
FIG. 3 is a schematic diagram of image processing as performed by the finger sensor apparatus as shown in FIG. 1 and simplified to show only two finger sensing arrays for clarity of illustration.

Referring now additionally to FIG. 3, aspects of the image data set processing are further described. Only two of the finger image sensing arrays 45, 46 are illustrated for clarity of explanation. Each array 45, 46 produces a variable vertical pixel pitch image 60, 61 from which the finger velocity profile 63 is generated. This is input to product the high resolution deskewed sparse matrix image 65 and ultimately the downsampled fixed vertical pixel pitch image 66.

Figure 4:
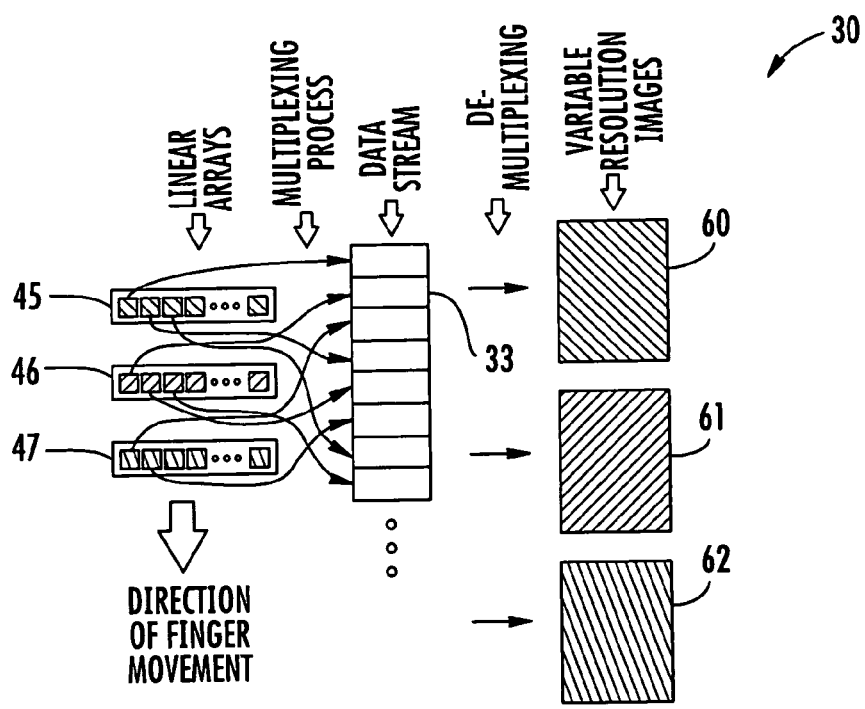
FIG. 4 is a further schematic diagram of image processing, and including multiplexing, as performed by the finger sensor apparatus as shown in FIG. 1.

Acquisition of the finger image data sets is now further explained with additional reference to FIG. 4. The three linear arrays 45-47 operate simultaneously, continuously capturing data. Scanning of the linear arrays 45-47 can optionally be synchronized to simplify subsequent data processing. Data from the arrays may be captured on a regularly timed basis or may be time stamped to provide the temporal reference data needed by the resampling algorithm. The pixel data from the arrays 45-47 may be multiplexed into a single data stream for convenient transmission from the arrays to a processor, such as an onboard processor or the device processor 32 as described above. It may then be de-multiplexed to recover the raw image data sets or images 60-62 generated by each of the arrays.

Figure 5:
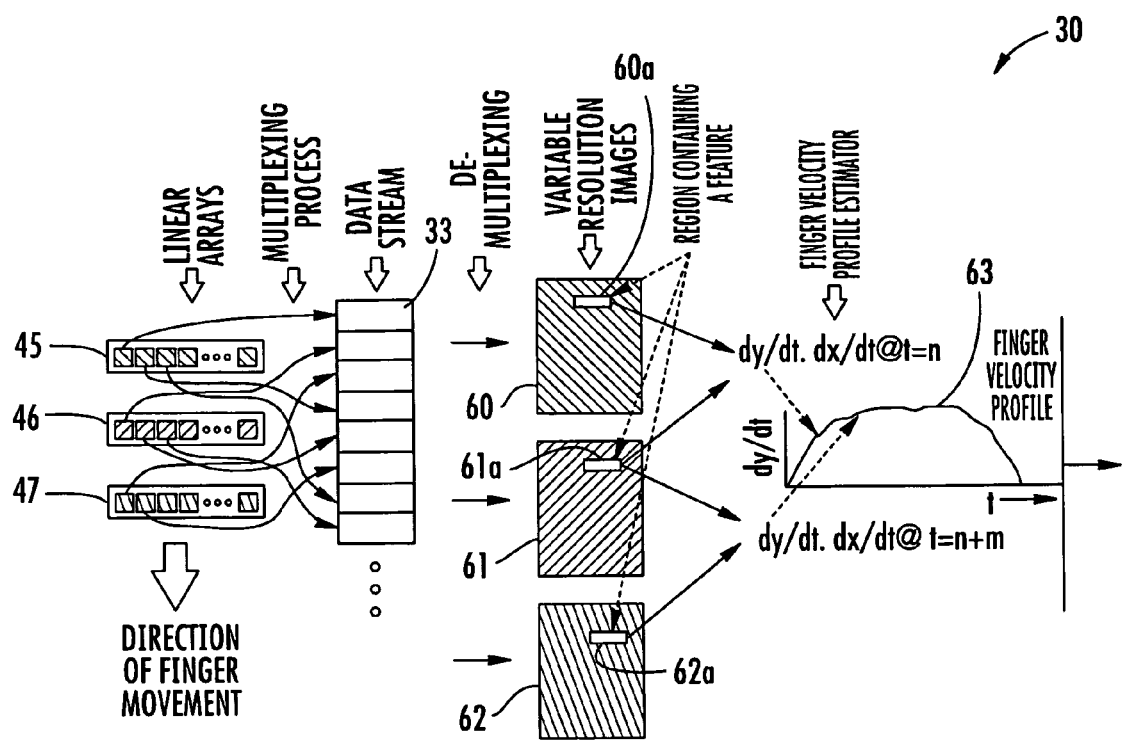
FIG. 5 is a more detailed schematic diagram of image processing, and including finger movement determining, as performed by the finger sensor apparatus as shown in FIG. 1.

Referring now additionally to FIG. 5, the finger velocity profile 63 is an estimate of the finger velocity at each point in time over the duration of the sliding finger 35 presentation. One exemplary approach to determining the finger velocity profile is to identify and track features of the fingerprint as they pass across each of the linear arrays 45-47 in sequence. The velocity can be calculated by identifying the position of an area 60*a* -62*a* containing a feature in each of the raw images 60-62. In this illustrated embodiment the y direction is the direction of dominant finger motion, normal to the long axis of the linear sensor arrays 45-47, and the x direction is parallel to the linear sensor arrays. Velocities in both the x and y direction can be calculated allowing adaptation to diagonal motion of the finger.

Features of the finger 35 can be identified and tracked through the images 60-62 from the sensing arrays 45-47 using a variety of approaches as well known to those skilled in the image processing art. Since the vertical (y axis) pixelation of the raw images 60-62 can vary, features represented by areas 60a-62a that are wide (x) and short (y) can be easier to work with and may produce good results over a wider range of finger speeds. In this case a feature might simply be an area with a good variety of gray scale variation. Clearly the confidence level of the estimate of the velocity profile 63 will vary depending on the number of points on the curve that are computed, and for sensors 31 with more than two linear arrays, on the degree of redundancy in the velocity calculations performed. Smoothing, interpolation, curve fitting, and other data enhancement methods can be applied to the velocity profiles where appropriate as will be appreciated by those skilled in the art.

Slow finger speeds are characterized by raw images 60-62 that are oversampled with respect to the physical feature and pixel sizes. At high finger speeds the raw images 60-62 may become undersampled. In embodiments that use larger numbers of linear arrays, such as three or more, successful resampling can still be performed, using undersampled raw images, as long as the aggregate sample rate of all of the sensor arrays put together exceeds the base sample rate required to image the features of interest, i.e., based upon the Nyquist criterion.

Figure 6:
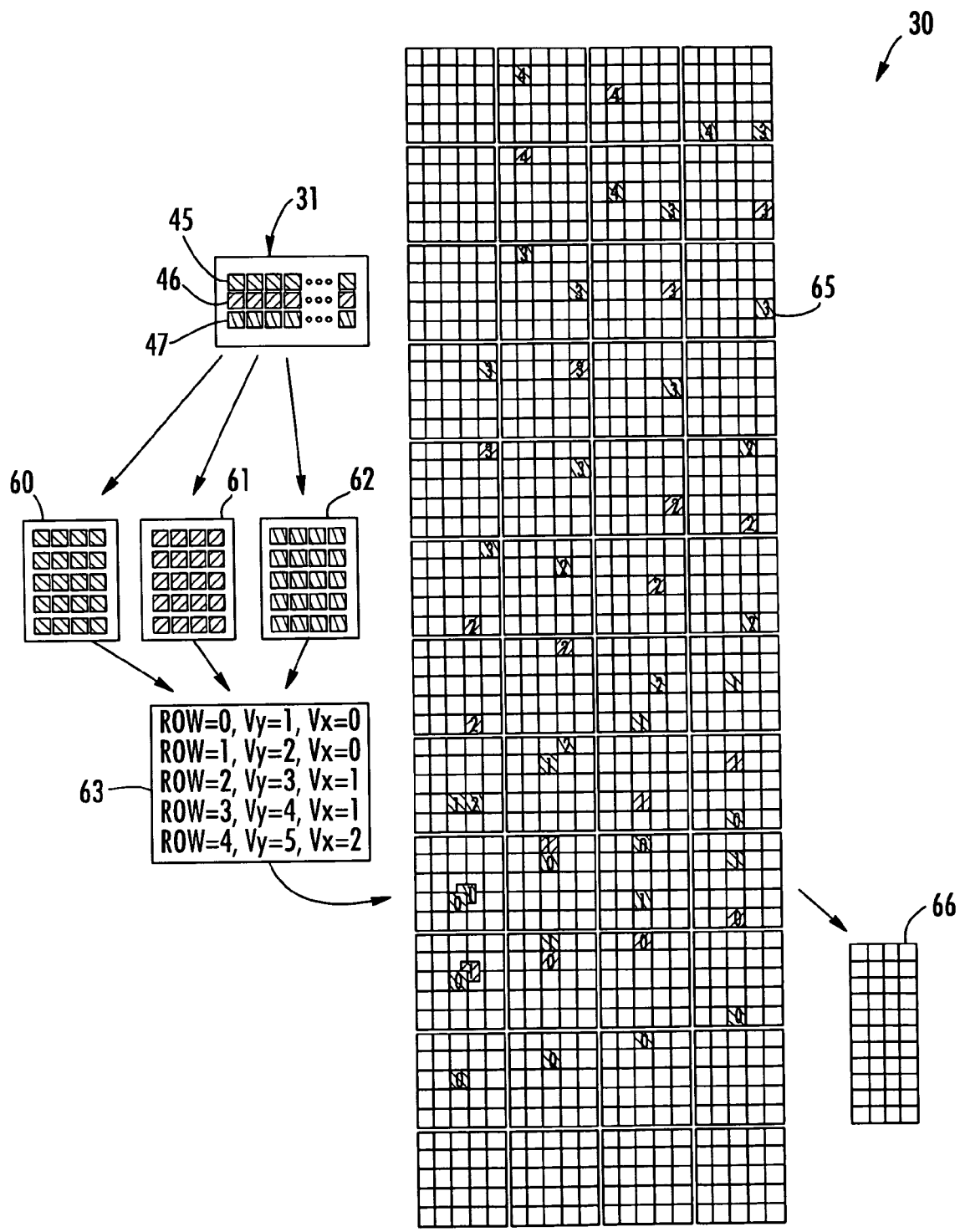
FIG. 6 is a more detailed schematic diagram of image processing, and including resampling, as performed by the finger sensor apparatus as shown in FIG. 1.
Figure 7:
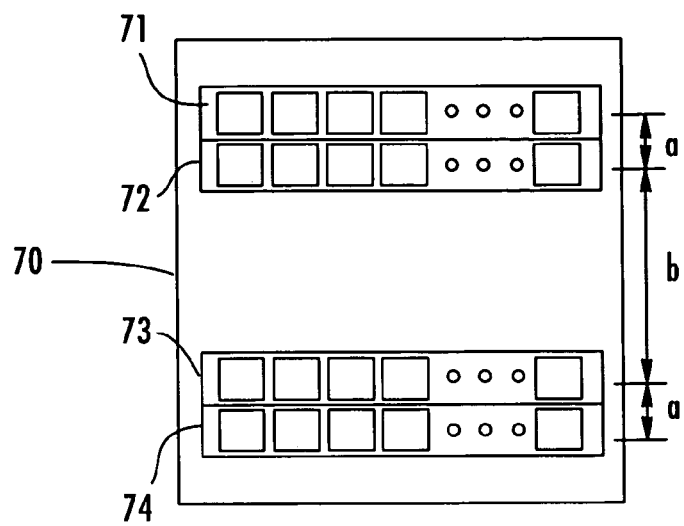
FIG. 7 is a schematic diagram of finger image sensing arrays in an example of the finger sensing apparatus according to the invention.
Figure 8:
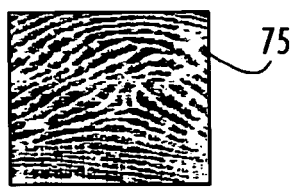
FIGS. 8-11 are sample finger images from the finger sensing arrays in the example of FIG. 7.
Figure 9:
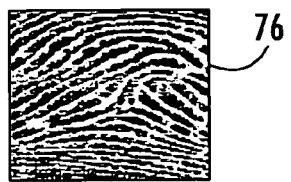
Figure 10:
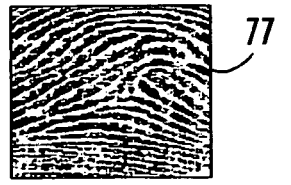
Figure 11:
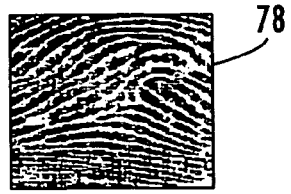
Figure 12:
FIG. 12 is a linearly stretched sample image based upon a single sample finger image processed according to the prior art.

Referring now additionally to FIG. 6, finger velocity based resampling is now further described. When the finger 35 is moved across the arrays 45-47 they generate three complete images 60-62 of the finger at a vertical resolution that varies with the speed of the finger. The illustrated embodiment uses an example using a velocity profile 63 in tabular form that might be generated by starting the finger 35 slowly across the arrays 45-47 and continually speeding up.

The cross-hatched spots on the large grid of the matrix 65 illustrate the placement of the pixel values (gray-scale) from the raw images onto the normalized image based on the velocity profile shown. In this illustrated embodiment, the normalized image is represented initially in a supersampled form, and then downsampled after all of the raw pixels have been placed to produce the final image 66. This subpixelation minimizes the resampling digitization errors that would otherwise occur. Other approaches are available to control these errors that are less memory intensive as will be readily appreciated by those skilled in the art.

The number inside each hatched pixel indicates which scan (or row) of the raw image this data came from. For example, the gray scale data to be placed in the backward diagonally hatched zero-containing pixels all comes from the zeroth row of the backward diagonally hatched raw image 62. Since the finger 35 in this example is sliding downward, the first data seen in the data stream (and hence the top of the raw images) is data about the lower part of the finger. In the example shown here, this inversion is corrected in the process of mapping the raw images 60-62 into the integrated image 65, so the final image 66 has the correct orientation and handedness. It can be seen that when the finger 35 is moving slowly, near the bottom and middle of the image, multiple measurements are combined to produce the final value of each output pixel. When faster finger speeds are encountered, the data is automatically spread evenly across the output pixels. After the data has been placed in the super sampled array 65, it is downsampled to the desired vertical and horizontal resolution using any one of a number of downsampling algorithms well known to those versed in image processing. By optimally resampling the integrated image data, downsampling algorithms for this type of image can produce maximum likelihood estimates of the original image even when the raw data is noisy, weak, or of variable quality.

Figure 13:
FIG. 13 is a sample complete image based upon the sample finger images of FIGS. 8-11 and processed according to the present invention.

Referring now additionally to FIGS. 7-13 the processing of exemplary finger image data is now described. More particularly, the finger sensor 70 used to generate the data in this example had four linear arrays 71-74 of 196 pixels each, with the arrays spaced with a=50 microns and b=300 microns. The variable vertical resolution images of the entire finger that are generated by each of the linear arrays 71-74 are illustrated by the images 75-79 in FIGS. 8-11, respectively. These images 75-79 have been displayed as if they contained fixed resolution data with the horizontal and vertical resolution equal. In fact, at the finger sliding speed used in this example, the pixels represent areas of the image that are larger vertically than horizontally. The result of this display method is that these images appear squashed vertically. A comparison of the image that results from linearly stretching the image from a single array is shown by the image 81 in FIG. 12, while the image 80 that results from resampling and combining the four variable vertical resolution images as described here is shown in FIG. 13.

Variations in the finger sliding speed can be seen in the image 81 (FIG. 12) from the single array as apparent variations in the ridge widths and bending of the ridge direction angles. This image distortion is corrected in the resampled image 80 in FIG. 13. Note that the resampled image 80 leans to the right. This is the result of the finger sliding slightly diagonally over the sensor 70. The finger sensor apparatus detects the small horizontal velocity and compensates for it during resampling. This compensation has a normalizing effect permitting much more accurate pattern matching as will be appreciated by those skilled in the art.

As will also be appreciated by those skilled in the art, more than one finger biometric may be sensed as disclosed for example, in Published U.S. Patent Application No. 2005/0089202 entitled "Multi-biometric finger sensor including electric field sensing pixels and associated methods", assigned to the assignee of the present invention, and the entire contents of which are incorporated herein by reference. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger sensor apparatus comprising:
 a plurality of finger image sensing arrays for generating a respective plurality of finger image data sets based upon sliding finger movement over said plurality of finger image sensing arrays; and
 a processor cooperating with said plurality of finger image sensing arrays for determining finger movement based upon the plurality of finger image data sets, and for generating a resampled finger image data set by resampling the plurality of finger image data sets based upon the determined finger movement by at least
  using the determined finger movement to arrange the plurality of finger image data sets into a single array to thereby generate a supersampled finger image data array having a resolution greater than a resolution of each finger image data set, and
  downsampling the supersampled finger image data array to generate a downsampled finger image data array having a resolution lower than the resolution of the supersampled finger image data array and thereby defining the resampled finger image data set.

2. The finger sensor apparatus according to claim 1 wherein said processor further deskews the plurality of finger image data sets when generating the resampled finger image data set.

3. The finger sensor apparatus according to claim 1 wherein said processor scans each of said plurality of finger image sensing arrays so that each finger image data set defines a complete finger image data set.

4. The finger sensor apparatus according to claim 1 wherein said processor determines finger movement based upon identifying and tracking at least one finger feature in each of the plurality of finger image data sets.

5. The finger sensor apparatus according to claim 4 wherein said processor determines finger movement in two dimensions.

6. The finger sensor apparatus according to claim 1 wherein said processor further determines a finger match based upon the resampled finger image data set and a stored finger image data set.

7. The finger sensor apparatus according to claim 1 further comprising a display; and wherein said processor generates a finger image on said display based upon the resampled finger image data set.

8. The finger sensor apparatus according to claim 1 wherein each of said plurality of finger image sensing arrays comprises a linear array of finger image sensing pixels.

9. The finger sensor apparatus according to claim 8 wherein each of said finger image sensing pixels comprises an integrated circuit finger image sensing pixel.

10. The finger sensor apparatus according to claim 1 further comprising a multiplexed data bus connected between said plurality of finger image sensing arrays and said processor.

11. The finger sensor apparatus according to claim 1 wherein said processor is separated from said plurality of finger image sensing arrays.

12. The finger sensor apparatus according to claim 1 wherein at least some adjacent ones of said plurality of finger image sensing arrays are arranged with a nonuniform spacing.

13. An electronic device comprising:
a housing; and
a finger sensor apparatus carried by said housing and comprising
  a plurality of finger image sensing arrays for generating a respective plurality of finger image data sets based upon sliding finger movement over said plurality of finger image sensing arrays, each of said plurality of finger image sensing arrays comprising a linear array of integrated circuit finger image sensing pixels, and
  a processor cooperating with said plurality of finger image sensing arrays for determining finger movement based upon the plurality of finger image data sets, and for generating a resampled finger image data set by resampling the plurality of finger image data sets based upon the determined finger movement by at least
    using the determined finger movement to arrange the plurality of finger image data sets into a single array to thereby generate a supersampled finger image data array having a resolution greater than a resolution of each finger image data set, and
    downsampling the supersampled finger image data array to generate a downsampled finger image data array having a resolution lower than the resolution of the supersampled finger image data array and thereby defining the resampled finger image data set.

14. The electronic device according to claim 13 wherein said processor further deskews the plurality of finger image data sets when generating the resampled finger image data set.

15. The electronic device according to claim 13 wherein said processor scans each of said plurality of finger image sensing arrays so that each finger image data set defines a complete finger image data set.

16. The electronic device according to claim 13 wherein said processor determines finger movement based upon identifying and tracking at least one finger feature in each of the plurality of finger image data sets.

17. The electronic device according to claim 13 wherein said processor further determines a finger match based upon the resampled finger image data set and a stored finger image data set.

18. The electronic device according to claim 13 further comprising a display carried by said housing; and wherein said processor generates a finger image on said display based upon the resampled finger image data set.

19. A finger sensing method comprising:
generating, using a processor, a respective plurality of finger image data sets based upon sliding finger movement over a plurality of finger image sensing arrays;
determining, using the processor, finger movement based upon the plurality of finger image data sets; and
generating, using the processor, a resampled finger image data set by resampling the plurality of finger image data sets based upon the determined finger movement by at least
  using the determined finger movement to arrange the plurality of finger image data sets into a single array to thereby generate a supersampled finger image data array having a resolution greater than a resolution of each finger image data set, and
  downsampling the supersampled finger image data array to generate a downsampled finger image data array having a resolution lower than the resolution of the supersampled finger image data array and thereby defining the resampled finger image data set.

20. The method according to claim 19 wherein generating the resampled finger image data further comprises deskewing the plurality of finger image data sets.

21. The method according to claim 19 wherein the processor scans each of the plurality of finger image sensing arrays so that each finger image data set defines a complete finger image data set.

22. The method according to claim 19 wherein determining finger movement comprises determining finger movement based upon identifying and tracking at least one finger feature in each of the plurality of finger image data sets.

23. The method according to claim 19 further comprising determining a finger match based upon the resampled finger image data set and a stored finger image data set.

24. The method according to claim 19 further comprising generating a finger image on a display based upon the resampled finger image data set.

25. The method according to claim 19 wherein each of the plurality of finger image sensing arrays comprises a linear array of finger image sensing pixels.

26. The method according to claim 25 wherein each of the finger image sensing pixels comprises an integrated circuit finger image sensing pixel.

* * * * *

UNITED STATES PATENT AND TRADEMARK OFFICE
CERTIFICATE OF CORRECTION

PATENT NO. : 7,734,074 B2  Page 1 of 1
APPLICATION NO. : 11/356895
DATED : June 8, 2010
INVENTOR(S) : Setlak et al.

It is certified that error appears in the above-identified patent and that said Letters Patent is hereby corrected as shown below:

| | |
|---|---|
| Column 1, Line 50 | Delete: "include" <br> Insert: --including-- |
| Column 1, Line 59 | Delete: "suffers" <br> Insert: --suffer-- |
| Column 2, Line 32 | Delete: "samping" <br> Insert: --sampling-- |
| Column 4, Line 61 | Delete: "downsamping" <br> Insert: --downsampling-- |
| Column 6, Line 24 | Delete: "systems" <br> Insert: --system's-- |

Signed and Sealed this

Fourteenth Day of September, 2010

David J. Kappos
*Director of the United States Patent and Trademark Office*